United States Patent [19]
Rochat

[11] 3,749,931
[45] July 31, 1973

[54] SAFETY DEVICE FOR AUTOMOBILE VEHICLES AND THE LIKE

[76] Inventor: Freddy Rochat, 1341 Vers-Chez-Grosjean, Vaud, Switzerland

[22] Filed: Nov. 30, 1971

[21] Appl. No.: 203,371

[30] Foreign Application Priority Data
Dec. 1, 1970   Switzerland...................... 17811/70

[52] U.S. Cl. ............... 307/10 AT, 180/114, 340/64
[51] Int. Cl............................................. H02g 3/00
[58] Field of Search..................... 307/10 R, 10 AT; 123/146.5 B, 198 B; 340/63, 64; 180/114

[56] References Cited
UNITED STATES PATENTS

| | | | |
|---|---|---|---|
| 3,610,943 | 10/1971 | Jones.............................. | 307/10 AT |
| 3,614,458 | 10/1971 | Stein.............................. | 307/10 AT |
| 3,605,087 | 9/1971 | Nine.......................... | 307/10 AT X |

Primary Examiner—Robert K. Schaefer
Assistant Examiner—William J. Smith
Attorney—Raymond A. Robic

[57] ABSTRACT

The starter switch of an automobile vehicle is series connected to the ignition coil via a thyristor, and is connected, via delay means and a second contact of coupled switch, to a monitor device for producing a perceptible signal after a variable time interval from actuating the starter switch. Said delay means simultaneously supplies the base of a transistor via an R-C time-constant, the collector-emitter lead of this transistor being connected to the control line of the thyristor via the first contact of said coupled switch. Said contacts are coupled so that when one is open, the other is closed whereby when the starter switch is actuated whilst the second contact is closed and the first contact open, the ignition coil is excited if the second switch is actuated within a selected time interval after production of said signal.

6 Claims, 1 Drawing Figure

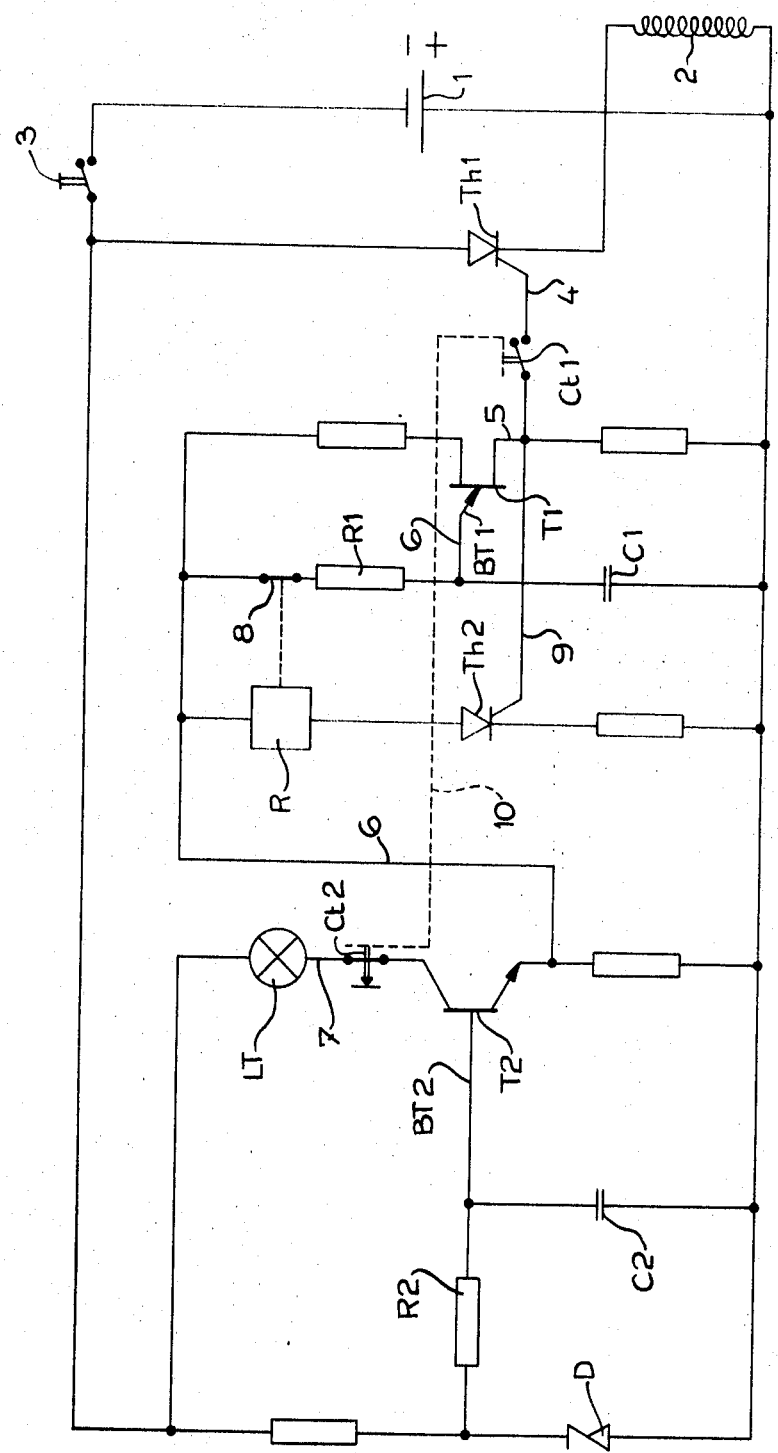

SAFETY DEVICE FOR AUTOMOBILE VEHICLES AND THE LIKE

BACKGROUND AND OBJECT OF THE INVENTION

This invention relates to manually operable apparatus comprising electrically actuable starting means, which apparatus requires a desired reflex action by an operator for the satisfactory operation thereof. An example of such an apparatus is an automobile vehicle, it being well known that vehicle drivers' physical states, for example drunkenness, which impair their reflexes, also render them inapt to safely drive, as can be deduced from road accident statistics.

It is an object of the invention to provide a device by means of which the starting up of, for example, an automobile vehicle motor can be subordinated to the driver having a desired reflex action, so that persons in a state of drunkenness or any other physical state which impairs their relfeces cannot start up the motor, and are therefore prevented from driving the vehicle.

SUMMARY OF THE INVENTION

This object can be achieved by providing the vehicle ignition circuit with means for only allowing feed of the ignition coil by the successive actuation of two switches, namely the conventional ignition or starter switch and a supplementary switch, actuation of this supplementary switch being effective to close the ignition circuit only during a selected interval of time after a perceptible signal, for example optical or acoustic.

According to one aspect of the invention, a safety device for an apparatus of the above mentioned kind comprises a manually actuatable first switch, means for producing a perceptible signal after a certain time interval from actuating said first switch, a manually actuable second switch, and circuit means for actuating said sarting means only when the second switch is actuated within a selected interval of time after production of said perceptible signal.

Preferably, the means for producing the perceptible signal produce said signal after a variable time interval from actuating said switch.

In a preferred embodiment of the invention, a safety device for automobile vehicles, in which the feed circuit for the primary winding of the ignition coil comprises, in series with a manually actuable ignition switch, a thyristor whose control circuit is fed, via a first contact of a manually actuable coupled switch with coupled first and second contacts arranged such that when one of said first and second contacts is open the other is closed, by the emitter-collector lead of a first transistor whose base is itself fed with a time constant by the emitter-collector lead of a second transistor, which lead is provided on the one hand with the second contact of the coupled switch, and on the other hand with a monitor device for producing a perceptible signel, the base of said second transistor being fed with a time constant by the current source when the manual ingition switch is closed, said circuit also comprising a second thyristor fed by the emitter-collector of the first transistor and whose control circuit is directly connected to the emitter-collector line of the first transistor, this second thyristor actuating a relay controlling a third contact located in the base lead of the first transistor. In operation, when the manual ignition switch is closed, whilst the coupled switch has its first contact open and its second contact closed, the monitor device produces a perceptible signal after a time determined by the time constant with which the second transistor is fed, the base of the first transistor being fed at the same time as said monitor device, such that after a time determined by the time constant with which the base of the first transistor is fed the first thyristor operates providing that meanwhile, that is after appearance of the signal produced by the monitor device, the coupled switch has been actuated to close said first contact and enable the control line of said first thyristor to be fed, operation of said first thyristor producing feed of the primary winding of the ignition coil, which enables starting up of the motor. However, if the coupled switch is not actuated in time, the first thyristor does not operate which prevents starting up of the motor, the second thyristor, whose control lead is fed as soon as the second transistor supplies an impulse, actuating the relay which opens the third contact thus breaking the supply to the base of the first transistor, which prevents said first transistor from supplying a new impulse which would repeat the operation, the second contact of the coupled switch located in the emitter-collector line of the second transistor preventing the second switch from being operated in advance, that is before the signal is produced, because the second contact is broken when this switch is opened, thus preventing the emitter-collector lead of the second transistor from supplying the monitor device.

DETAILED DESCRIPTION OF THE PREFERRED EMBODIMENT

The single FIGURE of the accompanying drawing shows, by way of example, the circuit diagram of the preferred embodiment of device according to the invention, for application to an internal combustion engine motor vehicle.

The circuit comprises a current source 1, namely the battery of the automobile vehicle, connected in series with a primary winding 2 of the vehicle's ignition coil, and a conventional ignition or "starter" switch 3.

Feed of the winding 2 from the output terminal of the switch 3 takes place through a thyristor $Th_1$ connected in series and whose control line 4 is connected, via the contact $Ct_1$ of a coupled two-contact manual control switch, to the emitter-collector lead 5 of a first unijunction transistor $T_1$. The base $BT_1$ of transistor $T_1$ is fed, with a resistor-capacitor time-constant comprising a resistor $R_1$ and a capacitor $C_1$, by a lead 6 connected to the base of a second transistor $T_2$ with an emitter-collector lead 7.

A contact 8 controlled by a relay R is connected in series in the supply lead 6 of the base $BT_1$ of transistor $T_1$. This relay R is actuated by a second thyristor $Th_2$, fed by the lead 6, and whose control lead 9 is directly connected to the emitter-collector 5 of the first transistor $T_1$.

The emitter-collector lead 7 of the second transistor $T_2$ comprises, in series, a monitor light LT and the second contact $Ct_2$ of the coupled manual switch comprising the contact $Ct_1$, as indicated in dashed lines 10. These contacts $Ct_1$ and $Ct_2$ are coupled such that when one is open the other is closed.

The base $BT_2$ of transistor $T_2$ is fed by the current source 1, when the ignition switch 3 is closed, with a resistor-capacitor time-constant comprising a resistor $R_2$ (which is a thermistor, as described later on) and a capacitor $C_2$. A Zener diode D serves to maintain a constant voltage for charging the capacitor $C_2$.

In operation, to start the vehicle the driver closes the ignition switch 3, which has the effect of charging the capacitor $C_2$ with the time-constant $R_2$–$C_2$. Initially, the contact $Ct_2$ of the coupled switch is closed whilst the contact $Ct_1$ is open and the contact 8, controlled by the relay R, is closed.

After a lapse of time determined by the time-constant $R_2$–$C_2$, the transistor $T_2$ becomes conducting and the monitor lamp LT lights up to provide a visual signal perceptible to the driver, at the same time as the lead 6 is fed.

The capacitor $C_1$ thus charges up with the time-constant $R_1$–$C_1$ which determines the lapse of time after which the unijunction transistor $T_1$ produces an impulse capable of triggering the two thyristors $Th_1$ and $Th_2$.

If, in the meantime, the coupled manual switch actuating the two contacts $Ct_1$ and $Ct_2$ has been operated, the contact $Ct_1$ is thus closed and the thyristor $Th_1$ can operate, thus feeding the primary winding 2 of the ignition coil, which enables starting of the motor.

If, to the contrary, said coupled switch has not been operated within said lapse of time, the contact $Ct_1$ is open at the moment when the transistor $T_1$ emits its impulse, so that the thyristor $Th_1$ does not operate and the primary winding of the ignition coil is thus not fed.

The thyristor $Th_2$ operates, whatever be the position of the contact $Ct_1$, and actuates the relay R to open contact 8. It is thus not possible for the capacitor $C_1$ to recharge so that the transistor $T_1$ is prevented from emitting a new impulse directly after the first.

Moreover, operation of the coupled switch not only closes the contact $Ct_1$, but also opens the contact $Ct_2$. Consequently, it would be futile for the driver to try and operate the said coupled switch in advance, that is before the monitor lamp LT lights up. In effect, opening of the contact $Ct_2$ cuts the emitter-collector lead 7 of the transistor $T_2$ and thus makes actuation of the transistor $T_2$ without effect on the lamp LT.

The device also comprises mechanical means, not shown, for the momentary manual closing of the contact 8 normally closed by the relay $R_1$ so as to enable the driver to carry out further attempts to start the motor. Of course, said mechanical means would not enable the contact 8 to be held permanently closed.

The resistor $R_2$ is a thermistor with high temperature sensitivity so that the time-constant $R_2$–$C_2$ varies as a function of the ambient temperature. The time interval between the moment when the driver closes the ignition switch 3 and when the monitor lamp LT lights up thus varies, so that the driver cannot become used to this interval and therefore acquire a conditionned reflex which could enable him to start the motor whilst he was in a deficient physical state. Of course, other means could be employed for varying the delay in producing the perceptible signal.

As a variant, the optical indicator formed by the monitor lamp LT could be replaced by other means for producing a perceptible signal, for example an acoustic indicator producing sound signals.

What is claimed is:

1. Safety device for manually operable apparatus such as an automobile vehicle, which apparatus comprises electrically actuable starting means and requires a desired reflex action by an operator for the satisfactory operation thereof, said device comprising a manually actuatable first switch, means for producing a perceptible signal after a certain time interval from actuating said first switch, a manually actuable second switch, circuit means for actuating said starting means only when the second switch is actuated within a selected interval of time after production of said perceptible signal, a first thyristor connected in series between said first switch and said starting means, the control lead of said thyristor being connected in series via a first contact of said second switch with the emitter-collector lead of a first transistor, the base of said first transistor being fed via a first R–C time-constant by the emitter-collector lead of a second transistor, said emitter-collector lead of the second transistor also controlling via a second contact of said second switch a device for producing a perceptible signal, the base of said second transistor being connected in series with a second R–C time-constant with said first switch, the first and second contacts of said second switch being coupled so that when one of said first and second contacts is open the other is closed.

2. Device according to claim 1, comprising a second thyristor connected to the emitter-collector lead of said first transistor, and a relay controlling a third contact in the base lead of the first transistor.

3. Device according to claim 2, comprising means for non-permanently manually closing said third contact.

4. Device according to claim 1, in which said second R-C time-constant comprises a thermistor.

5. Device according to claim 1, in which said first transistor is a unijunction transistor.

6. Device according to claim 1, comprising a Zener diode in the feed lead to the base of said second transistor.

* * * * *